United States Patent
Atkins et al.

(10) Patent No.: US 7,876,766 B1
(45) Date of Patent: Jan. 25, 2011

(54) METHOD AND APPARATUS TO ENABLE INTEROPERATION BETWEEN MULTI-MEDIA MESSAGING SERVICE CENTERS

(75) Inventors: R. Travis Atkins, Santa Cruz, CA (US);
Brian Bodmer, Santa Cruz, CA (US);
Eric O. Bodnar, Santa Cruz, CA (US);
John Rodriguez, Capitola, CA (US)

(73) Assignee: Syniverse ICX Corporation, Tampa, FL (US)

( * ) Notice: Subject to any disclaimer, the term of this patent is extended or adjusted under 35 U.S.C. 154(b) by 1671 days.

(21) Appl. No.: 10/996,006

(22) Filed: Nov. 22, 2004

(51) Int. Cl.
*H04L 12/56* (2006.01)
*H04J 3/22* (2006.01)
*G06F 15/16* (2006.01)

(52) U.S. Cl. .............. 370/401; 370/465; 709/206; 709/230

(58) Field of Classification Search .......... 370/401, 370/465–468, 471; 379/88.13, 88.22; 709/206, 709/219, 230, 246, 205, 207, 224; 455/466
See application file for complete search history.

(56) References Cited

U.S. PATENT DOCUMENTS

| | | | |
|---|---|---|---|
| 5,781,901 A | | 7/1998 | Kuzman |
| 5,892,900 A | | 4/1999 | Ginter et al. |
| 5,903,723 A | | 5/1999 | Beck et al. |
| 6,208,663 B1 * | 3/2001 | Schramm et al. ............ 370/465 |
| 6,256,666 B1 | | 7/2001 | Singhal |
| 6,657,702 B1 | | 12/2003 | Chui et al. |
| 7,516,454 B1 * | 4/2009 | Rodriguez ................ 718/100 |

| | | | |
|---|---|---|---|
| 2002/0044634 A1 * | 4/2002 | Rooke et al. ............. 379/93.01 |
| 2003/0193967 A1 * | 10/2003 | Fenton et al. ................ 370/490 |
| 2004/0092273 A1 * | 5/2004 | Valloppillil ................. 455/466 |
| 2004/0111476 A1 * | 6/2004 | Trossen et al. ............. 709/206 |
| 2005/0033852 A1 * | 2/2005 | Tenhunen .................... 709/229 |
| 2005/0075093 A1 * | 4/2005 | Lei et al. .................. 455/412.1 |
| 2005/0091367 A1 * | 4/2005 | Pyhalammi et al. ......... 709/224 |
| 2005/0132015 A1 * | 6/2005 | Swinton ..................... 709/207 |
| 2005/0235048 A1 * | 10/2005 | Costa-Requena et al. ... 709/219 |
| 2005/0265525 A1 * | 12/2005 | Tang et al. ................ 379/88.13 |
| 2006/0029192 A1 * | 2/2006 | Duddley et al. .......... 379/88.13 |
| 2008/0043763 A1 * | 2/2008 | Johnson et al. ............. 370/401 |

FOREIGN PATENT DOCUMENTS

WO       WO 01/33470       5/2001

OTHER PUBLICATIONS

Business Editors, ImageScape 2000 Highlights Digital Imaging Explosion in E-Business, Business Wire, Mar. 1, 2000, 3 pages.
Business Editors, LightSurf Infrastructure to support MultiMedia Messaging Services. Business Wire, Mar. 19, 2001, 2 pages.
Motorola, Kahn Unite on Photos, Asian Wall Street Journal, New York, Feb. 8, 2000, 2 pages.
Neil McCormick, "How you'll obtain songs from now on: What does Internet access to the world's music libraries mean for the $40-billion-a-year music industry? In a word: revolution" [National Edition], National Post. Don Mills, Ont.: Jan. 3, 2000. p. D.9, 3 pages, downloaded from the ProQuest on the Internet on Mar. 20, 2007.

* cited by examiner

*Primary Examiner*—Pankaj Kumar
*Assistant Examiner*—Saba Tsegaye
(74) *Attorney, Agent, or Firm*—Blakely, Sokoloff, Taylor & Zafman, LLP; Judith A. Szepesi

(57) ABSTRACT

A method and apparatus for providing an exchange server to couple multiple MMSCs, the exchange server including a queue to receive the MMS message if the recipient MMSC does not have bandwidth available.

37 Claims, 10 Drawing Sheets

METHOD AND APPARATUS TO ENABLE INTEROPERATION BETWEEN MULTI-MEDIA MESSAGING SERVICE CENTERS

FIELD OF THE INVENTION

The present invention relates to multi-media messaging centers (MMSC), and more particularly to interoperation between MMSCs.

BACKGROUND

Multi-media messaging centers (MMSCs) enable users to exchange multi-media messages, including photographs, video, audio, and other data. Unlike SMS messages, which are in the same format, multi-media messages depend on the formats supported by various user's handsets, and by various MMSCs. For example, the photograph may be in various formats such as JPEG, GIF, Bitmap, or other image formats. Similarly, multiple formats are available for video, audio, and other data. In general, most MMSCs support one or two formats for each type of data. Communicating such data between users of the same MMSC is relatively easy, since the data format is identical for the requester and the recipient. However, in order to enable an MMSC to pass a message to a second MMSC, which may support different formats and may have different restrictions, the MMSC must either convert the data to the recipient's preferred format, or run the risk of the message being rejected.

Currently, MMSCs from various providers are attempting to set up reciprocal relationships with other MMSCs. However, this requires each MMSC to negotiate and sign a separate agreement, and it requires the MMSC to be aware of all of the format restrictions of each receiving MMSC. Therefore, progress has been slow in enabling users of different MMSCs to communicate.

SUMMARY OF THE INVENTION

A method and apparatus for a exchange relay to enable communication between MMSCs is described. The exchange server includes a retry queue to receive the MMS message if the recipient MMSC does not have bandwidth available.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
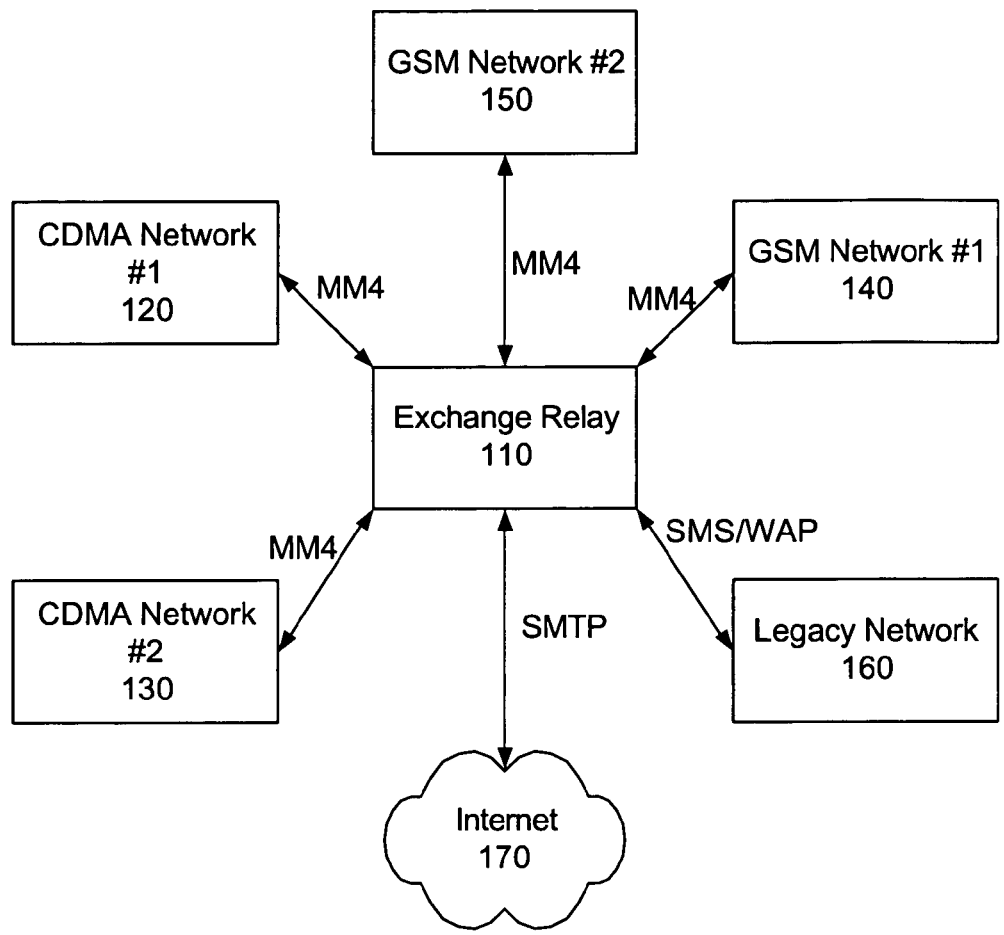
FIG. 1 is a block diagram of one embodiment of a network including the exchange relay.

The method and apparatus describe an exchange relay, which enables interoperation between various MMSCs. The exchange relay routes multimedia message traffic—including text, pictures, audio and video—from one wireless operator to another, enabling sharing across networks. The exchange relay's message adaptation technology permits display of multimedia messages on MMS and non-MMS devices in real-time, to enable delivery of messages that may include any combination of text, pictures, audio and video. The exchange relay, in one embodiment supports MMS handsets as well as many legacy non-MMS devices. The exchange relay connects all types of multimedia messaging devices across all mobile data network technologies to extend the reach of interoperability beyond the MMS devices on each network.

In one embodiment, the exchange server reads and writes encoded routing information. This encoding of routing information works even in heterogeneous environments including different providers' MMSCs. The exchange server automatically detects when another exchange server has lost connectivity, and stores the messages in a retry queue. The exchange server then automatically determines when the MMSC has regained connectivity, and sends stored messages from the retry queue. In one embodiment, the sending rate is designed not to overwhelm the receiving MMSC. The exchange server, in one embodiment, provides an "on demand" resource allocation to service temporary spikes above an operator's allowable number of requests. The exchange server, in one embodiment, reduces the number of SPID lookups by encoding the SPID data into the message ID. This SPID will be shared across relay servers and networks. The exchange server ensures that the message ID is rewritten when a message is returned to external MMSCs to ensure compatibility.

In one embodiment, the exchange relay can handle interfaces between CDMA or GSM networks. The Exchange relay helps operators manage the complex arrangement of numerous point-to-point connections between other operators and content providers, which requires a massively scalable, centralized platform that can handle huge message volumes. The exchange relay lets the operator focus on their customers while the exchange relay manages the complicated task of interoperability. This eliminates the need for individual MMSCs to negotiate operating requirements, service level agreements, and protocol specifics with each and every other MMSC with which they connect.

Furthermore, the exchange relay provides a mechanism for accelerating time to market deployment of new messaging applications, and the ability to remain current with evolving standards. The exchange relay's hosted and managed system ensures a fun, hassle-free user experience for customers, by allowing them to send MMS messages to everyone, regardless of what carrier they are with.

The exchange relay ensures a seamless messaging experience through transcoding and the ability to manage hundreds of device and files types—including text, picture, audio and video—for message delivery to any device, across diverse operator networks.

The exchange relay provides a standards-compliant service that offers both MM4 and MM1 interoperability—traffic from an MMSC to MMS capable handsets (MM1) and directly between MMSCs (MM4). In one embodiment, MM7 service is also provided.

The exchange relay, in one embodiment, is designed to rapidly scale to meet the increasing demands of a growing market.

In one embodiment, the exchange relay provides 3GPP, 3GPP2, and OMA standards compliance. In one embodiment, the exchange relay ensures seamless integration of future technologies and services as the standards evolve and change.

In one embodiment, the exchange relay utilizes comprehensive event and traffic logging capabilities (e.g. type of message, specific message content, etc.) to provide operators with the verification that every message is delivered in its optimal form. In one embodiment, the exchange relay can support multiple billing structures between operators (e.g., per message, per byte, per upload, by provider, by content, timed-based, etc.), and features extensive event and traffic logging that enable the creation of customized billing records.

FIG. 1 is a block diagram of one embodiment of a network including the exchange relay. The exchange relay 110 is coupled to various MMSCs 120, 130, 140, 150. In one embodiment, the MM4 protocol is used to communicate between at least some of the MMSCs 120, 150 and the exchange relay 110. In one embodiment, MM1 may be used to communicate between the MMSC 140 and exchange relay 110. This enables the MMSCs 120, 130, 140, 150 to use the protocols used to communicate MMSC to MMSC, and thus requires no additional configuration. In another embodiment, the MM7 protocol, designed for communications with Value Added Services (VAS) is used to communicate between the exchange relay 110 and an MMSC 130. In one embodiment, a single MMSC may communicate with the exchange relay 110 using various protocols at various times. In one embodiment, all MMSCs communicating with a particular exchange relay are required to use the same protocol. In another embodiment, each MMSC may set up different protocols. In one embodiment, a modified protocol may be used. For example, in one embodiment, the message ID in the multimedia message headers may be modified, as will be described below.

In one embodiment, the MMSCs 120, 130, 140, 150 may be on different networks, such as CDMA, TDMA, GSM, G3, or another network format. The exchange relay 110, in one embodiment, is able to communicate with various network types, and translate between them.

In one embodiment, exchange relay 110 is further able to communicate with legacy networks 160 using a protocol supported by those legacy networks 160. In one embodiment, the legacy networks 160 may support short message service (SMS) and/or wireless access protocol (WAP) formats. In one embodiment, the system uses a separate notification and message server to handle messages sent to legacy networks 160. In another embodiment, the ability to handle such messages is built into the exchange relay 110.

In one embodiment, exchange relay 110 is further able to communicate with other devices including other networks 170 through the Internet. In one embodiment, the exchange relay 110 may use simple mail transfer protocol (SMTP) to communicate with other devices, including legacy networks, MMSCs, handsets, or any other authorized data recipients. The exchange relay 110, in one embodiment, may use SMTP to send billing and audit information to the various MMSCs 120, 130, 140, 150.

In one embodiment, the exchange relay 110 can also send messages directly to handsets. In one embodiment, MMSCs 120, 130, 140, 150 coupled to the exchange relay may choose to communicate directly, without using the exchange relay 110.

Figure 2:
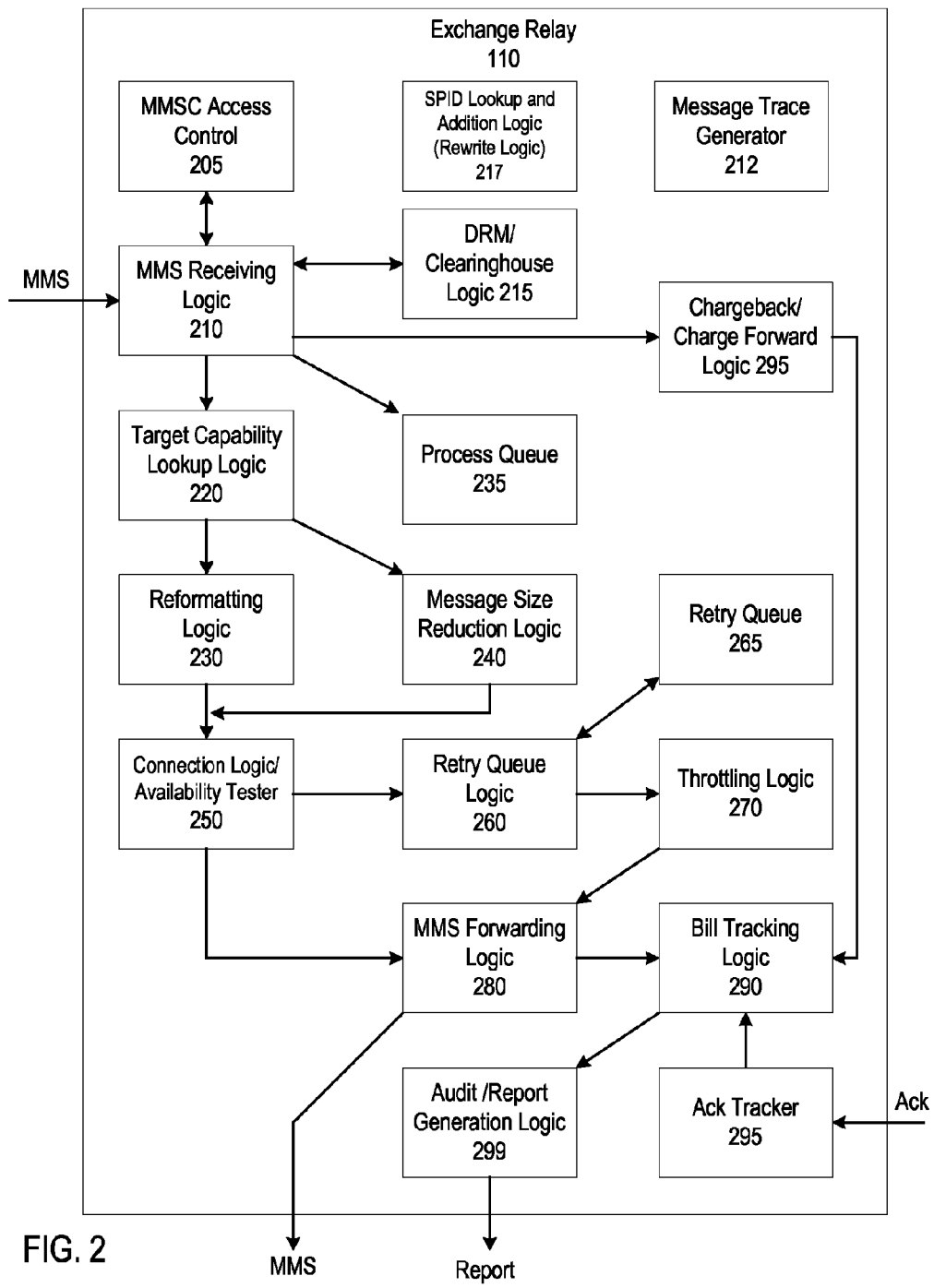
FIG. 2 is a block diagram of one embodiment of the exchange relay.

FIG. 2 is a block diagram of one embodiment of the exchange relay. The exchange relay 110 includes a receiving logic 210 to receive MMS messages from various MMSCs (not shown). The receiving logic 210 uses MMSC Access control 205, to determine whether the sending MMSC (the MMSC that originated the message) is eligible to send MMS messages using the exchange relay 110, and whether the recipient MMSC (the target of the message) is eligible. In one embodiment, this is a lookup in a simple XML file. If the originator and recipient are both authorized users, the receiving logic 210 passes the MMS to the DRM/clearinghouse logic 215.

In one embodiment, the message rewrite logic or SPID lookup & addition logic 217 determines whether the MMS message includes the SPID (service provider ID) of the message originator and recipient. In one embodiment, the MMSC may include this information before transmitting the data to the exchange relay 110. In one embodiment, this information is included as a modified message ID in the message header. If this data is not included, the SPID lookup & addition logic 217 looks up the SPID information. It then adds this information to the message ID in the message header, in one embodiment. By adding this information to the message header, the exchange relay ensures that subsequent communications by other MMSCs or exchange servers about this message will not require SPID lookups. Furthermore, it enables the use of a distributed exchange server, such that only one exchange server needs to do an SPID look-up, even if the message is passed along to another exchange server.

The message trace generator 212 adds the message to a database in which message data is tracked. In one embodiment, the message trace data includes numerous fields, including the originator and recipient. In one embodiment, the present invention modifies the standard message trace by including the SPIDs of the message originator and recipient. As the message is further processed, as described below, in one embodiment the message trace is updated by the message trace generator 212, such that the message trace has an entry for each state transition in the message lifecycle. The message trace is used for billing and tracking. In one embodiment, the message trace is made available to telecom operators. In one embodiment, the message trace is made available to consumers. In one embodiment, the message trace is stored in a database. In another embodiment, the message trace is stored in another format.

The DRM/clearinghouse logic 215 includes a clearinghouse, for storing copies of each multimedia element that is received by the exchange relay 110. The DRM/clearinghouse logic 215, in one embodiment, ensures that only a single copy of any multimedia element is stored in the clearinghouse. In one embodiment, the DRM/clearinghouse logic 215 attempts to identify a best quality copy of the multimedia element, for storage in the clearinghouse. In one embodiment, the DRM/clearinghouse logic 215 fingerprints each multimedia element, as it stored. "Fingerprinting" in this context means creating a unique identification for the multimedia element. For example, a hashing algorithm may be used.

In one embodiment, the DRM/clearinghouse logic 215 further registers any digital rights management aspects of the multimedia element. For example, certain multimedia elements may have DRM restrictions associated with them. The DRM/clearinghouse logic 215 stores these DRM restrictions, and ensures that the DRM restrictions are observed in attempts to copy, forward, or otherwise use the multimedia element. The DRM restrictions may be, for example: a charge associated with forwarding or copying, or a restriction to forwarding only within the MMSC, or forwarding only to certain MMSCs, or various other types of restrictions. Since each multimedia element is fingerprinted when it is first received, the system can enforce DRM rules across multiple MMSCs' communications.

The receiving logic 210 also forwards the MMS message to the process queue 235. In one embodiment, the message is concurrently forwarded to the target capability lookup logic 220.

The process queue 235 is the list of messages to be sent to the particular MMSC. In one embodiment, the process queue 235 is a first-in first-out (FIFO) queue. In another embodiment, the process queue 235 includes the ability to prioritize messages. Thus, for example, messages from an MMSC with a higher service level may be passed through the process queue faster than messages from another MMSC. By adding a message to the process queue 235 before routing, verification, or authentication, the connection time to an operator's exchange server, MMSC, VAS or PPG is minimized.

In one embodiment, the process queue 235 is a flat file in a local file system. This enables the system to be fast and easily expandable.

Target capability lookup logic 220 determines the format and size restrictions for the destination MMSC, to which the message is to be forwarded. Each MMSC supports one or more formats for each type of multimedia element. For example, image files may be in the JPEG (Joint Photographic Experts Group), GIF (Graphic Interchange Format), or another format. When an MMSC registers with the exchange relay 110, it indicates which formats it can support. Furthermore, it indicates its maximum file sizes for various types of multimedia content. For example, a photographic image may be limited in size to 3 megabytes, while a video may be limited to 60 megabytes. In one embodiment, the capability lookup logic 220 includes an XML description that provides the following:

Maximum message size
Maximum send rate
IP Port
Network Type
Valid delivery time window
Allowable MMSC sender list If needed, reformatting logic 230 formats the message attachment to a format that can be handled by the receiving MMSC. In one embodiment, the reformatting logic 230 can handle any format supported by any of the MMSCs which may be coupled to the exchange relay 110.

Message size reduction logic 240 reduces the size of any message components. In one embodiment, compression may be used. In one embodiment, certain message elements may be discarded. In one embodiment, certain message elements may be reduced in size. In one embodiment, reformatting logic 230 may be used to reduce the size of messages by reformatting the display aspect for media messages. Alternative methods of reducing the size of the complete message may be used. The now properly sized and formatted message is sent to connection logic 250.

Connection logic 250 then attempts to establish a connection with the recipient MMSC.

In another embodiment, an availability tester determines whether the target MMSC is available to receive a message. In one embodiment, a message announcement is sent to indicate that a message is about to be sent out. In one embodiment, the message announcement includes one or more of the following: the size of the message, the destination of the message, a content listing, or any other relevant information. The target MMSC sends back an "OK to receive" notice. In one embodiment, the notice is simply a return of the notification header. In one embodiment, the announcement message is a very short message requesting availability information, to ensure that the announcement messages do not overwhelm an already overloaded MMSC. In another embodiment, the announcement messages are dispensed with entirely, as described above.

If a connection is successfully established, the MMSC forwarding logic 280 sends the MMS message to the MMSC. In one embodiment, throttling logic 270 controls the rate at which connection logic 250 attempts to open connections. In one embodiment, the throttle rate is defined by a minimum service level agreed-upon with an MMSC. In one embodiment, a maximum connection rate is also provided. In one embodiment, the throttling rate is set per MMSC. In another embodiment, various throttling methods, including measuring the rate at which the target MMSC is receiving and processing messages, may be used to reduce the throughput to ensure that the MMSC is not overwhelmed. One example of such a throttling rate, and how it may be used is described in U.S. patent application Ser. No. 10/808,767, assigned to the assignee of the present invention.

Bill tracking logic 290 tracks which messages were sent from which originating MMSC to which target MMSC. In one embodiment, bill tracking logic 290 also tracks individual originators and recipients for billing purposes. Bill tracking logic 290, in one embodiment, passes the billing data to audit/report generation logic 299 which generates reports for each MMSC in a format that is usable for that MMSC. In one embodiment, each MMSC may define a preferred format for the billing report, including what items are tracked, what the content of the tracking is, etc.

In one embodiment, receiving logic 210 receives read reply reports and/or delivery reports, if requested by the originator. These reports are added to the message trace, and forwarded on. As noted above, the SPID is already stored in the message ID, and thus the system does not need to do another SPID lookup. In one embodiment, message rewrite logic 219 removes the SPID data added into the message header prior to returning the information to the originating MMSC. In this way, the system ensures that the MMSC receives the message with the original message ID. This allows interoperability in a heterogeneous environment of MMSCs and exchange servers.

In one embodiment, if connection logic 250 could not establish a successful connection, either because no response is received or because the response indicates that the MMSC is currently too busy, the message is passed to retry queue logic 260. Retry queue logic 260 adds the message to a retry queue 265. In one embodiment, the retry queue resides on a network file system (NFS). In one embodiment, the retry queue is a database.

The retry queue 265, in one embodiment, is a separate retry queue for each MMSC. In another embodiment the retry queue 265 is a single queue. In one embodiment, the retry queue is a FIFO (first-in first-out) buffer. In another embodiment, priorities may be added. The retry logic 260 periodically attempts to open the connection to deliver a message in the retry queue. In one embodiment, the retry logic 260 uses the same connection logic 250 to attempt to open a connection.

The exchange server 110 provides a process queue and retry queue. These queues provide an effective buffer, so that an originating MMSC may delete a sent message, received by the exchange relay 110. This eliminates the need for each MMSC to maintain its own internal queue because the exchange server provides an always-available, fully-redundant system, which provides unlimited queuing for the member MMSCs. Especially in cases where a destination MMSC may be offline for some time, even hours, having to maintain an internal database/queue to track such undelivered messages is a large cost. Thus, the central queue provided by the exchange server 110 of the present invention is a significant advantage.

In one embodiment, MMSC access control 205 is used to set up the preferences for the MMSC. These preferences may include: billing details, audit/report formats, throttling preferences, notification ping contents, and any other preferences.

Figure 3:
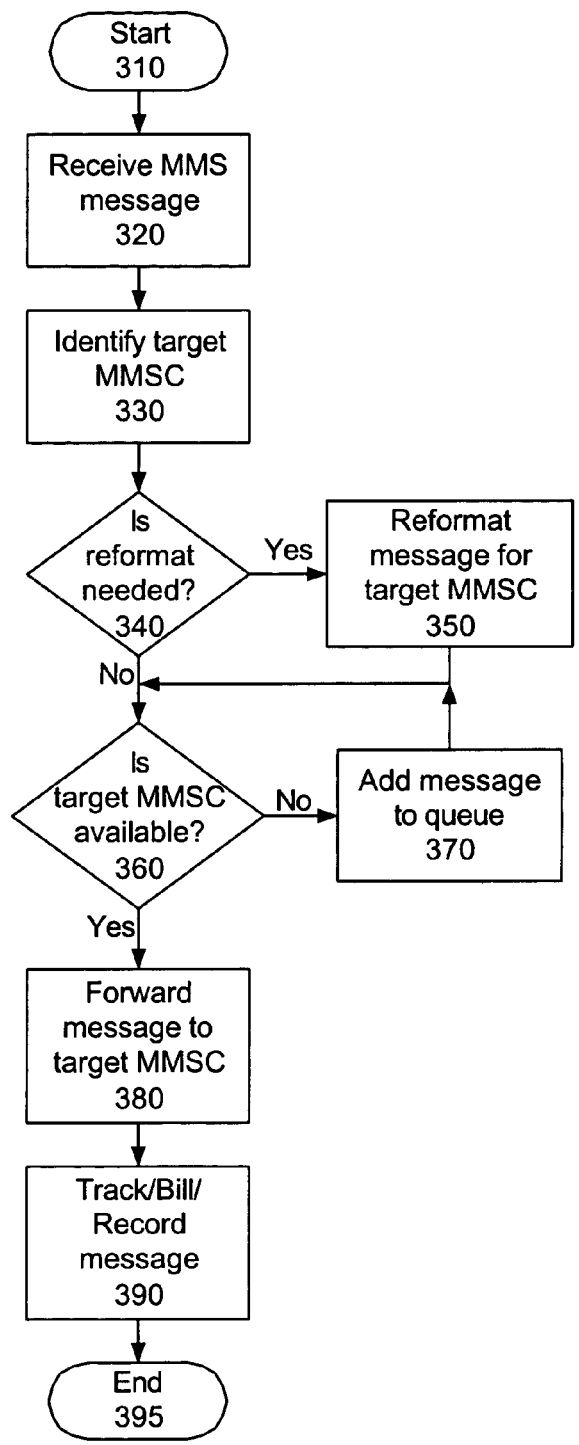
FIG. 3 is an overview flowchart of one embodiment of using the exchange relay.

FIG. 3 is an overview flowchart of one embodiment of using the exchange relay. The flowchart illustrates effectively the process of a thread spawned when the exchange relay is invoked by a message. The process starts at block 310. At block 320, an MMS message is received by the exchange relay. In one embodiment, MMS messages are received only from MMSCs that have been registered, and directed to MMSCs that have been registered. In one embodiment, MMSCs are permitted to automatically register, such that all MMSCs are supported. In one embodiment, certain additional services may be available only to subscribing MMSCs. For example, the notification may include additional data, for subscribing MMSCs, the queue may be longer, the MMS messages from or to the MMSC may be processed faster, or other preferential treatment may be provided.

At block 330, the target MMSC is identified. The identification of the MMSC includes retrieval of the relevant information about the MMSC. The relevant information may include: the current status, the data formats supported, any size limitations for MMS attachments, and any other relevant information.

At block 340, the process determines if the MMS message needs to be reformatted, i.e. whether the target MMSC supports the data formats in the MMS attachment and can handle the size of the attachments. If reformatting is needed, at block 350 the message is reformatted to the appropriate form for the target MMSC. In one embodiment, the target MMSC may respond with information regarding the appropriate format for the destination handheld device. In on embodiment, the exchange relay formats the message to that format, at block 350.

At block 360, the process determines whether a connection attempt to the target MMSC was successful. In one embodiment, the target MMSC accepts connection attempts only if it is available and can handle the traffic. If the target MMSC is not available, the message is added to a retry queue. In one embodiment, the process periodically attempts to establish a connection, as long as there are messages in the retry queue. In one embodiment, a separate thread is spawned for attempting to open connections for the retry queue.

If/When the target MMSC is available, the process continues to block 380, and the MMS message is forwarded to the MMSC. The results are then recorded. In one embodiment, the results are continuously recorded, as the message is being handled using a message trace mechanism. The process then ends at block 395.

Figure 4:
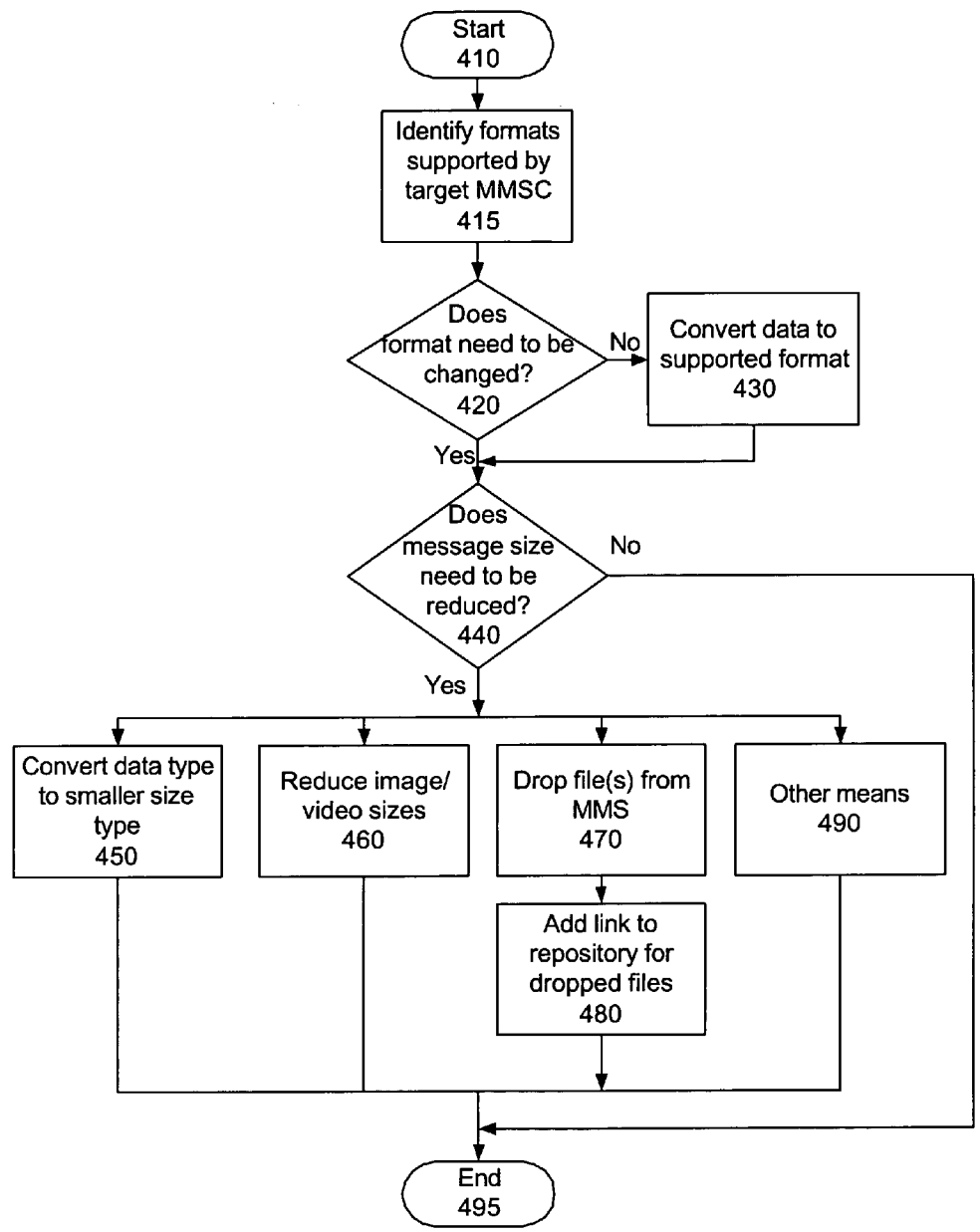
FIG. 4 is a flowchart of one embodiment of converting data.

FIG. 4 is a flowchart of one embodiment of handling formatting at the exchange relay. The process starts at block 410. At block 415, the formats supported by the target MMSC are identified. In one embodiment, the formats supported by the final destination handset are also identified, and used in this conversion process. At block 420 each of the MMS message elements—image, audio, video, and text, other—are evaluated. At block 430, any elements that need to be converted are.

At block 440, the process determines whether the overall message size needs to be reduced. Message size reduction may include one or more of the following: block 450 data size reduction using conversion (i.e. a conversion from Word format to PDF format reduces file size significantly), block 460 size reduction (e.g. a 1024×768 pixel image is larger than a 640×480), block 470 dropping files from the MMS message, or block 490 other means. In one embodiment, if the system drops files from the MMS message, a link to the file is added at block 480, so that the user can retrieve the original data in a subsequent message. In one embodiment, the format reduction used may be a combination of the above. In one embodiment, the MMSC may select which type of format reduction it prefers for its users. The process ends after the formatting is completed, at block 495.

Figure 5:
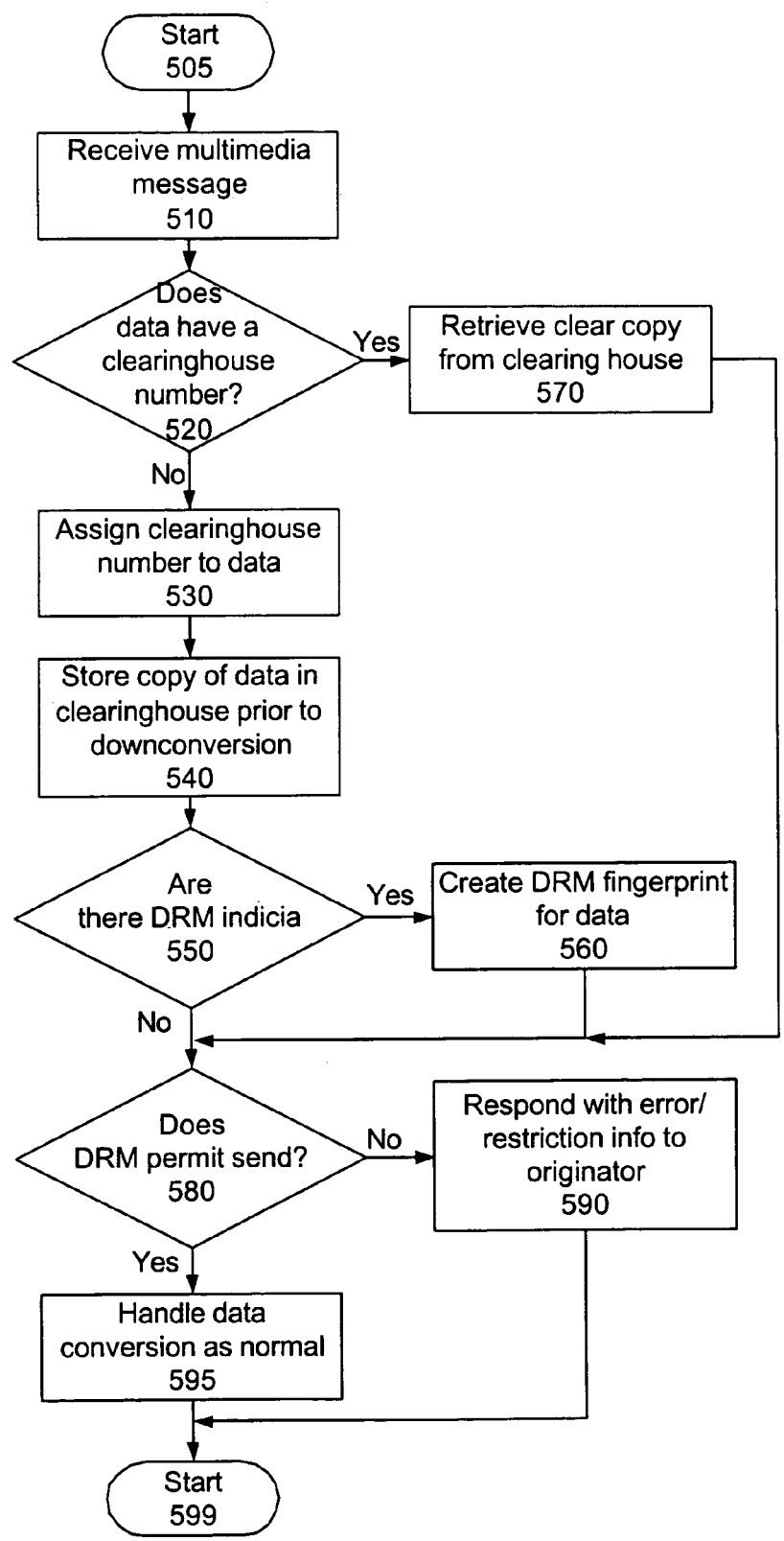
FIG. 5 is a flowchart of one embodiment of using a clearinghouse feature.

FIG. 5 is a flowchart of one embodiment of using a clearinghouse feature. The process starts at block 505.

At block 510, multimedia message is received.

At block 520, the process determines whether the MMS message has a clearing house number. A clearinghouse number is assigned to each original/new image, the first time it is encountered within the exchange relay. In one embodiment, a clearinghouse number may be attached by an external agency, such as the originating author or originating MMSC. In one embodiment, the present system assigns its own internal number as well, but tracks attachments by both numbers. In one embodiment, if the originator/MMSC coordinated with the exchange relay a single tracking mechanism may be used.

If the MMS message, or any of its attachments, already have a clearinghouse number, at block 570 the clear copy is retrieved from the clearinghouse. A clearinghouse number means that a copy of the attachment(s)/message already exists in its original format in the clearinghouse/repository. The process then continues to block 580.

If the data does not have a clearinghouse number, the process continues to block 530. At block 530, a clearinghouse number is assigned to the data. In one embodiment, each separate attachment receives its own clearinghouse number. In one embodiment, the clearinghouse numbers are assigned to indicate that the attachments belong together. For example, the clearinghouse numbers may be 1234A, 1234B, and so on. In another embodiment, the entire attachment receives a single clearinghouse number.

At block 540, a copy of the data is stored in the clearinghouse.

At block 550, the process determines whether there are any DRM (digital rights management) indicia associated with the data. In one embodiment, certain data creators may attach DRM indicators. For example, the message creator may indicate in a header, in one of a variety of formats, that the forwarding of this message is restricted. The exchange relay, in one embodiment, is DRM aware, and identifies any such DRM limitations. In one embodiment, if DRM indicia are present, the process creates a DRM fingerprint for the data at block 560. The process then continues to block 580.

At block 580, the process determines whether the DRM fingerprint permits sending the attachment/message. The DRM may restrict message sending, may charge for message sending, or may simply track the originator of a message. If the DRM does not permit sending, the process, at block 590, responds with an error and/or restriction information to the originator. The process then ends at block 599. If sending is permitted, at block 595, any data conversion is handled, keeping the original unconverted document in the clearinghouse. In this way, even if an MMSC requires significant downconversion of an image, the original good quality image is available in the clearinghouse. Furthermore, since the central exchange relay handles DRM issues, MMSCs need to be DRM-aware.

Figure 6:
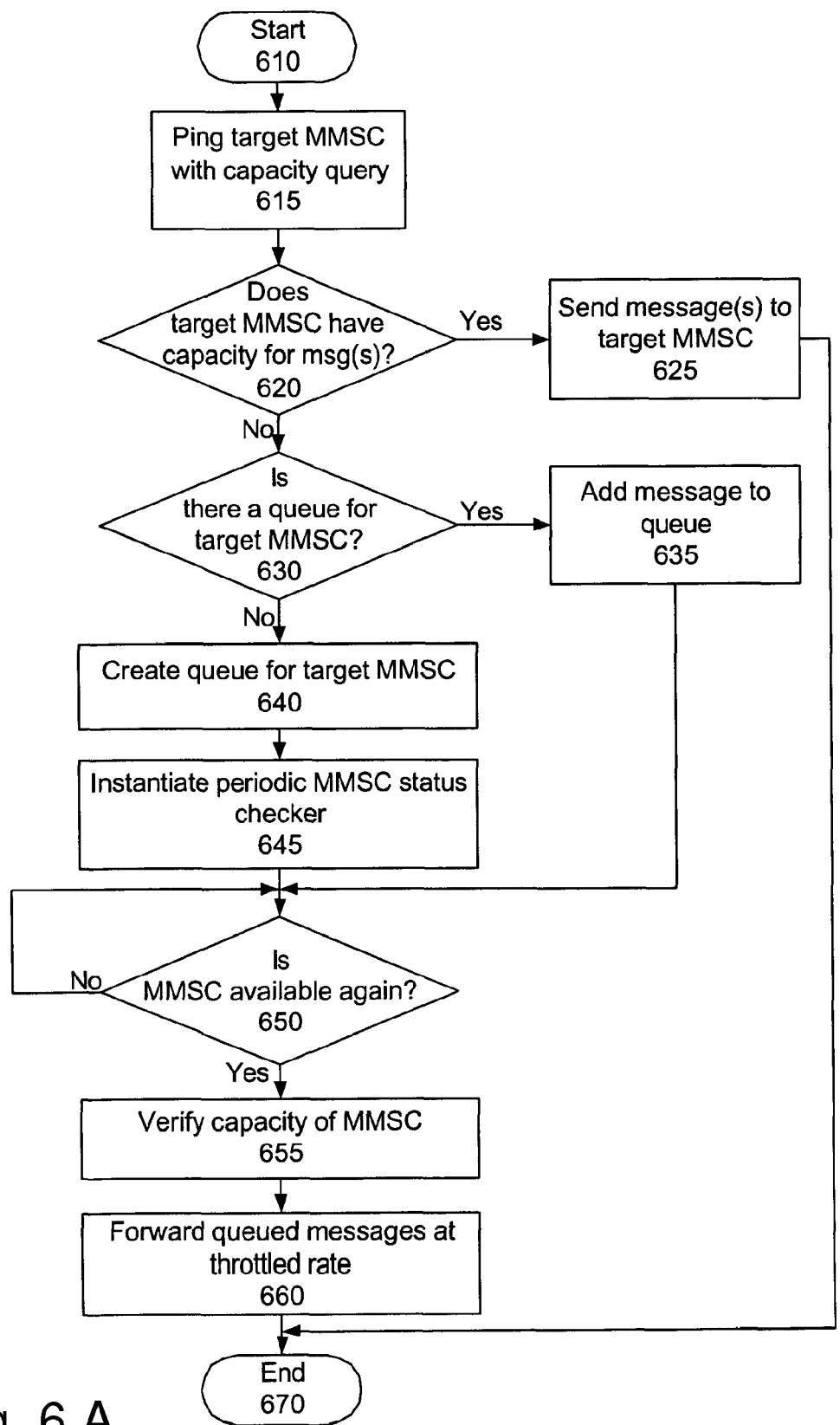
FIG. 6A is a flowchart of one embodiment of handling an off-line MMSC.
FIG. 6B is a flowchart of one embodiment of handling messages when an MMSC is not available.

FIG. 6A is a flowchart of one embodiment of handling messages when an MMSC is not available. The process starts at block 610, when one or more messages have been received and/or are in the queue for a particular MMSC.

At block 615, the process sends a capacity ping to the MMSC. In one embodiment, the capacity ping indicates the size of the MMS message to be sent. In another embodiment, the capacity ping is simply an inquiry. The capacity ping awaits a response from the MMSC.

At block 620, the process determines whether the target MMSC has the capacity to take the message(s). In one embodiment, this is based on the response from the MMSC. If no response is received, it is assumed that the MMSC does not have capacity. The MMSC may respond with a maximum capacity response, in which case only messages below that size would be sent. If the MMSC has the capacity for message(s), the process at block 625 sends the message(s) to the MMSC, in the above-described manner.

If the target MMSC does not have the capacity to handle the message(s), the process continues to block 630. At block 630, the process determines whether there is already a queue for the MMSC. If so, the messages not already in the queue are added to the queue at block 635. The process then ends at block 670.

If there is not a queue for the MMSC, at block 640, a queue is created for the MMSC. In one embodiment, a separate queue is created for each MMSC. In another embodiment, a single queue is used, and this step may be skipped.

At block 645, a periodic MMSC status checker is instantiated. The status checker periodically tests, as in block 650, whether the MMSC is available again. In one embodiment, in order to minimize the load on the MMSC, the status checker sends a ping, or simply attempts to open a connection. If the ping is successfully returned, then a larger availability message is sent. Once the MMSC is available, the process continues to block 665. If the ping does not return or if it returns with a delay beyond a preset threshold, the process pauses for a preset period of time and then repeats, reissuing periodic pings until a valid response to a ping is received.

At block 665, the capacity of the MMSC is verified. In one embodiment, the MMSC returns capacity information in response to the availability ping. At block 660, the queued messages are forwarded to the MMSC. In one embodiment, if needed, the queued messages are forwarded at a throttled (reduced) rate, to ensure that the MMSC is not overwhelmed. In one embodiment, the MMSC may indicate the maximum data rate which it wishes to accept. In another embodiment, the exchange relay 110 discovers the optimum rate to send the data to keep from overwhelming the MMSC, as described with respect to FIG. 7.

Figure 6B:
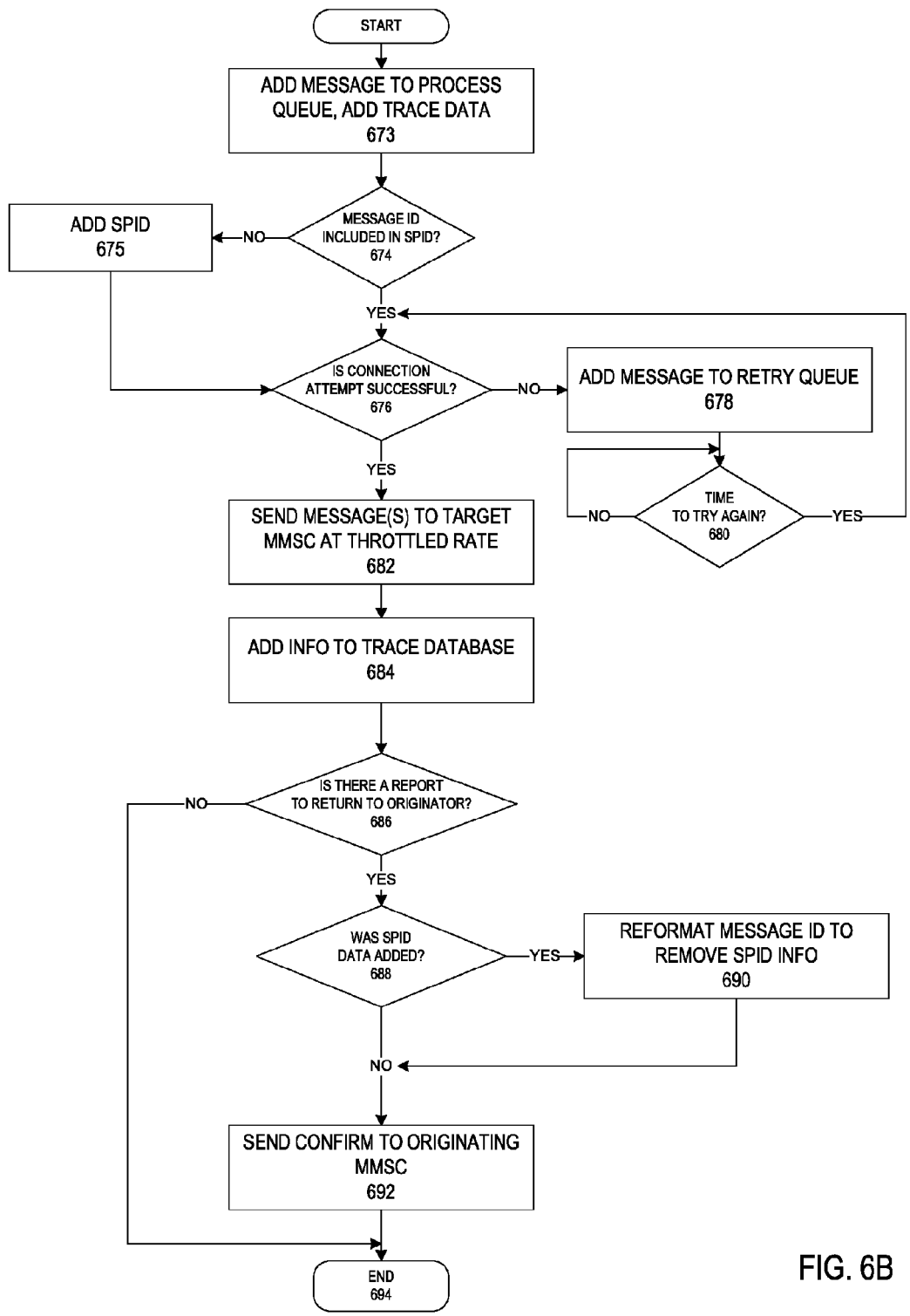

FIG. 6B is a flowchart of the preferred embodiment of handling messages when an MMSC is not available.

At block 673, the message is added to the process queue. The process queue is a very fast moving list that temporarily stores messages. This reduces the connection time to the originating MMSC, reducing load on operator equipment. In one embodiment, the message is stored in a local file system, in a flat file structure, to speed up the system.

At block 674, the process determines whether the message ID includes the SPID of the originator and recipient of the message. In one embodiment, certain MMSCs include this information, as they need to do an SPID look-up upon receipt of the original message from a user's handset. In one embodiment, the message ID is modified by the originating MMSC to read as follows:

a777#LS-dstSpid=123#LS-srcSpid=789, where
a777 is the original message ID
LS-dstSPID=123 indicates that the destination SPID is 123
LS-srcSPID-789 indicates that the source SPID is 789

In one embodiment, if no SPID is found as part of the message ID, the process continues to block 675, and an SPID is added. In one embodiment, the format of the rewritten message ID is as follows:

a777#LSG-dstSpid=123#LSG-srcSpid=456
a777 is the original message ID
LSG-dstSPID=123 indicates that the destination SPID is 123
LSG-srcSPID-789 indicates that the source SPID is 789
the G indicates that the message ID must be rewritten before the message is forwarded, since the originating MMSC is unaware of this rewrite.

The "LS" in this example indicates that the message ID came from an external MMSC that modified the message to include the SPID of the source and destination, or other relevant data. The "LSG" indicates that the message ID was added by the central exchange server. The message ID without an "LS" or "LSG" indicates that the message ID came from an external MMSC that did not add the SPID information into the message ID. This indicates that an SPID lookup needs to be performed.

Of course, one of skill in the art would understand that this format is merely exemplary, and the # used as separators, as well as the LS/LSG notation is arbitrary and may be changed. Furthermore, additional data may be encoded in the message ID. For example, the message ID may indicate what protocol should be used to send a delivery or read reply report to the originating MMSC, e.g. MM1 (MMSC-to-MMSC communication protocol) or MM7 (VAS-to-MMSC communication protocol). The process then continues to block 676.

If an SPID was found to be part of the message ID at block 675, the process continues directly to block 676.

At block 676, the process attempts to open a connection, and determines if the connection is successful.

If the connection attempt is not successful, the message is added to the retry queue at block 678. At block 680, the process determines whether it is time to retry the connection. In one embodiment, each retry queue (associated with a particular MMSC) has a single timer for retry. In another embodiment, a message in the retry queue may have a "frequency of retry" associated with it. If it is time to try again, the process continues to block 676, to attempt to open a new connection.

If the connection attempt is successful, the process continues to block 682, and the message is sent to the recipient MMSC. The data is then added to the message trace, at block 684.

At block 686, the process determines whether a read reply report or delivery report has been received. In one embodiment, these reports are only received if requested. In another embodiment, the system may default to such reports. In one embodiment, the exchange may override the user's original request, and request a delivery report. If no such report was received, the process ends at block 694.

If a report was received, at block 686 the process determines whether SPID data was added to the original message ID, at block 688. As noted above, when a message is received that does not include the originator & recipient's SPIDs, the system does a lookup, and adds this data to the message.

If the data was added by the exchange server, then it must be removed prior to sending the message on to the originating MMSC, so that the message ID of the receipt is identical to the original message ID created by the originating MMSC. Therefore, at block 690, before the message is forwarded, and before a read reply report or delivery report is returned to the originating MMSC, the system reformats up the message, and removes the SPID, and any other information that was added by the system. The process then continues to block 692. If the message ID was not modified by the exchange server, the process continues directly to block 692. The process described above, of rewriting the message ID only takes place in one embodiment. In another embodiment, the message ID remains unchanged throughout the process. In yet another embodiment, the MMS message with the altered ID is sent on to the MMSC.

The confirmation is then forwarded to the MMSC at block 692. The process then ends at block 694.

Figure 7:
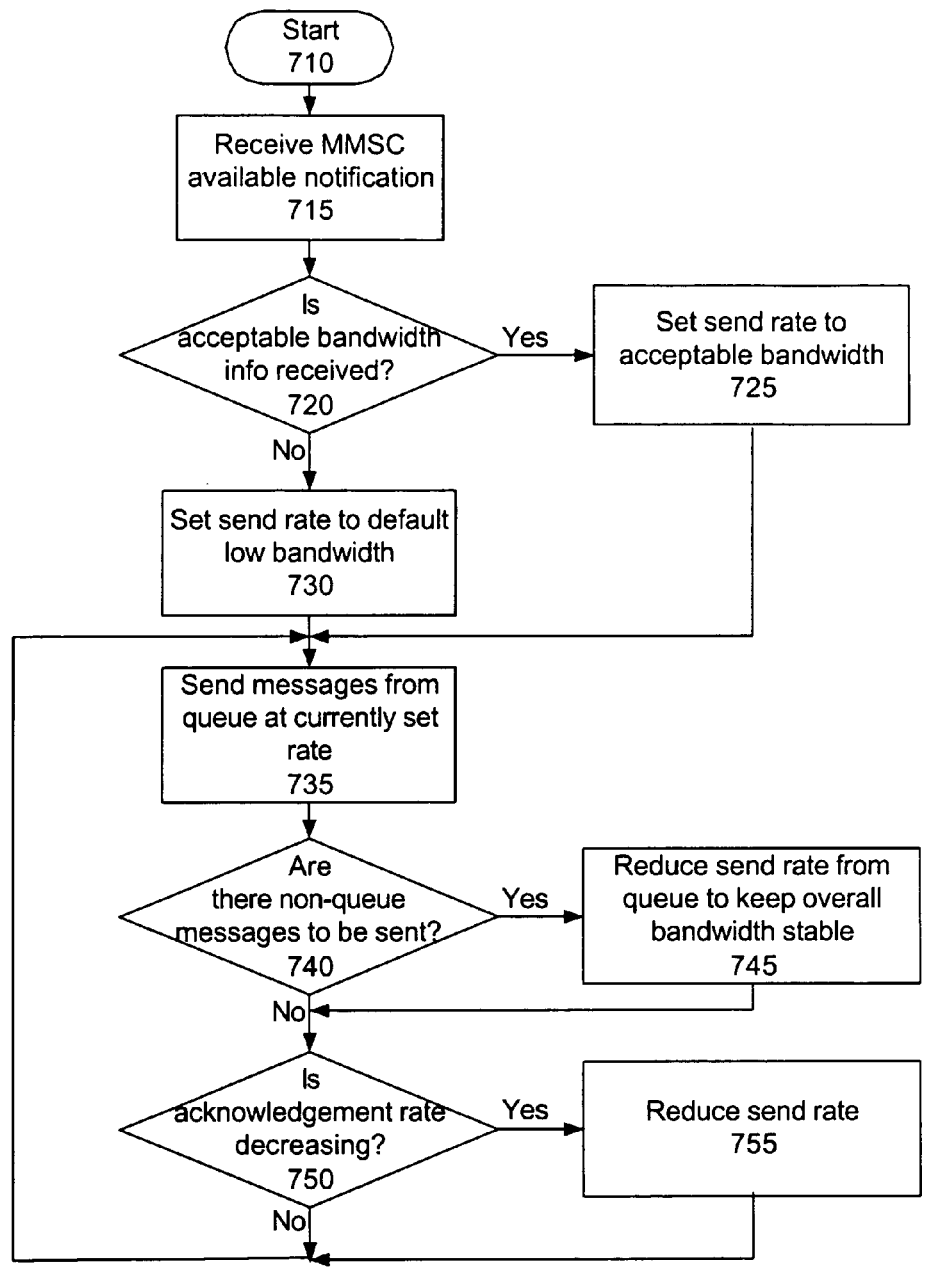
FIG. 7 is a flowchart of one embodiment of throttling the transmissions.

FIG. 7 is a flowchart of one embodiment of throttling the transmissions. In one embodiment, throttling levels are specified by MMSC. Each MMSC has a maximum rate, and in one embodiment a minimum rate. Messages are sent at least at the minimum rate, and at most at the maximum rate.

In another embodiment, the throttling process is only used when an MMSC has been unavailable, and there are a number of messages to be delivered in the queue. In another embodiment, the process may be used when an MMSC cannot handle the volume of messages being sent, even if the MMSC is not down. The process starts at block 710.

At block 715, the MMSC available notification, indicates that the MMSC is available to receive messages. In one embodiment, if the process is not being used for catching up with a queue, this step may be skipped.

At block 720, the process determines whether the MMSC has indicated the preferred bandwidth for transmission. In one embodiment, the MMSC may indicate, in its availability notification, what rate it would like to receive data. In one embodiment, the system, in its short status check message, requests this information. In another embodiment, the rate is preset in configuration data. If acceptable bandwidth information is received, the process, at block 725 sets the send rate, the rate at which data from the queue is sent to the MMSC. The process then continues to block 735.

If no such indication is received, the process, at block 730 sets the rate to a default low bandwidth. In one embodiment, the default bandwidth rate may be set per MMSC. That is, each MMSC may have an associated "default bandwidth" rate. In another embodiment, a single default bandwidth rate may be set for all MMSCs. The process then continues to block 735.

At block 735, messages from the queue are sent at a rate based on the currently set bandwidth.

At block 740, the process determines whether there are any non-queue messages to be sent. In one embodiment, the system continuously monitors to ensure that the combined bandwidth of the queue messages and the new messages being forwarded does not overwhelm the MMSC.

If there are no non-queue messages being sent, the process continues to block 750. If there are non-queue messages being sent, the process, at block 745 reduces the send rate. In one embodiment, the send rate is only reduced if the rate of non-queue data is at least a substantial portion of the data being sent. That is, if the overall bandwidth is significantly affected by the non-queue messages, in one embodiment, the incoming messages are put at the back of the retry queue. In one embodiment, the significant effect is greater than twenty-five percent of the messages. The process then continues to block 750.

At block 750, the process determines whether the acknowledgement rate is decreasing. Once an MMSC successfully receives all of the packets that constitute a multi-media message, it sends an acknowledgement indicating successful receipt. The period of time between messages being sent and the receipt of the acknowledgement indicates how overloaded the receiving MMSC is. Alternative methods of determining whether the MMSC is handling the volume well may be used.

If the MMSC is not handling the message volume well, the send rate is reduced. In one embodiment, the MMSC may indicate that it wishes to receive data at a higher rate. In that case, the send rate may be increased. The process returns to block 735, to continue sending messages from the queue at the current send rate.

In another embodiment, the system uses connection attempts to provide self-discovery to determine whether an MMSC is available to receive data. In one embodiment, a single handler is used to open connections to send messages from both the retry queue and the process queue. The single handler can, therefore, automatically adjust the send rate without the adjustment described with respect to FIG. 7.

Figure 8:
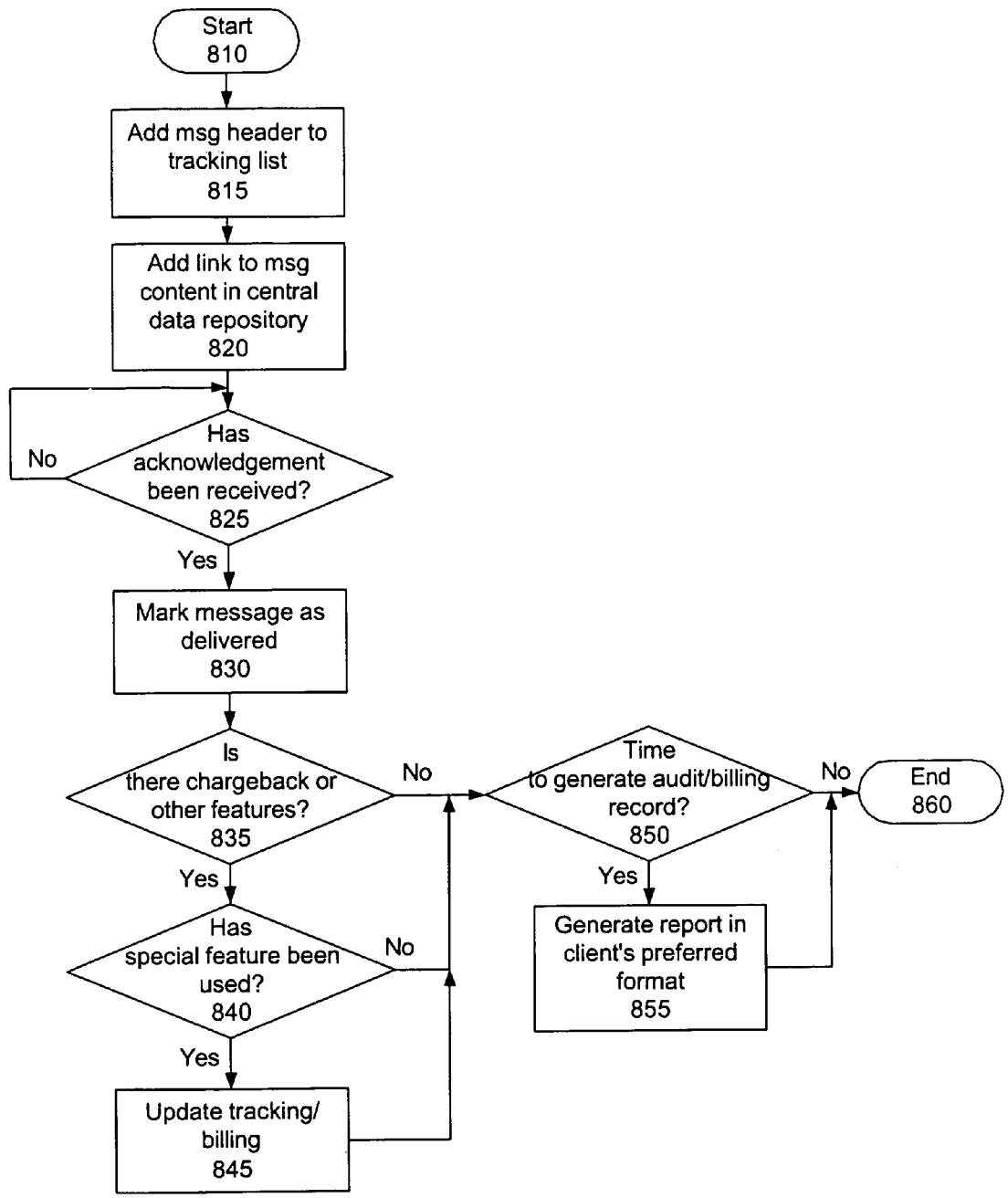
FIG. 8 is a flowchart of one embodiment of tracking and billing for MMS transactions.

FIG. 8 is a flowchart of one embodiment of tracking and billing for MMS transactions. The process starts at block 810, when a message is sent to a destination MMSC. At block 815, the message header data is added to the tracking list. In one embodiment, the message header in its entirety is added to the tracking list.

At block 820, a link to the message content in the central repository is added to the message header in the tracking list.

At block 825, the process determines whether a REQ/RES has been received. If an REQ/RES has been received, at block 830 the message is marked as delivered in the message trace. In one embodiment, the message is made available to the user through a web interface. In one embodiment, this feature is available as a supplemental feature, either provided directly to users or provided to all users through a subscribing MMSC.

At block 835, the process determines whether there is a chargeback feature used. One chargeback feature enables a first user to pay for a second user's response. This is referred to as reply-charging. In a business context, for example, a user may indicate that a customer can return back an edited document or image, without charge. This is the MMSC equivalent of collect calling. Another chargeback feature bills the user for forwarding DRM controlled materials. For example, the user may be subscribed to a service, such as iTunes. The user may forward a song downloaded from iTunes for a charge. The exchange relay tracks the DRM data that indicates this chargeback, and automatically creates an appropriate record to enable such chargeback.

If there is a chargeback feature, the process determines, at block 840 whether the special feature has been used. Certain chargeback features are not automatic, such as paying for a response. Furthermore, if the recipient doesn't download the DRM-controlled forwarded message, no charge should be made, in one embodiment. Thus, the process determines whether the chargeback feature was actually used. If the chargeback feature was used, the process updates the tracking/billing information at block 845. If not, the process continues to block 850.

At block 850, the process determines whether it's time to generate the audit/billing record for an MMSC. If it is not time to generate such records, the process ends at block 860. If it is time to generate such record, at block 855 the report is generated. In one embodiment, the report is generated in the format specified by the MMSC. The process then ends at block 860.

Figure 9:
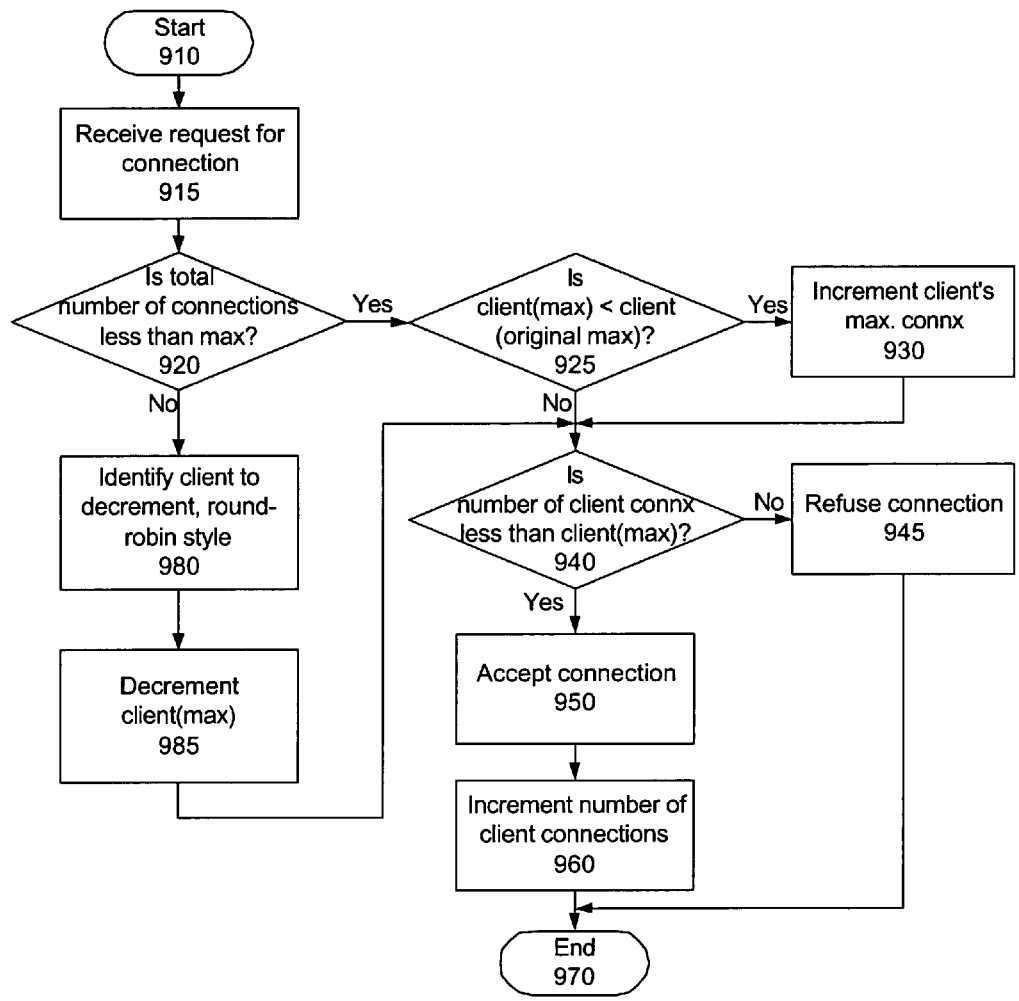
FIG. 9 is a flowchart of one embodiment of resource allocation between MMSCs accessing the exchange relay.

FIG. 9 is a flowchart of one embodiment of on-demand resource allocation between MMSCs accessing the exchange relay. This process is useful to provide a guaranteed level of service to an MMSC. The process starts at block 910. In one embodiment this process is continuously running whenever the exchange server is available.

At block 915, the exchange server receives a request for a connection. In one embodiment, each time an MMSC sends a message to the exchange server, it utilizes a connection. Thus, in order to send a message to the exchange server, the MMSC requests a connection.

At block 920, the process determines whether the number of active connections, for all MMSCs, is less than the maximum number of permitted connections. The maximum number of connections in this context is the maximum number of connections permitted to the exchange server.

If the total number of connections is less than the maximum available number of connections for the MMSC, the process continues to block 925.

At block 925 the process determines whether the client max (the currently set maximum number of connections) is less than the real/original maximum set of the client. In one embodiment, each MMSC has an associated real/original maximum permitted number of connections. In one embodiment, the real/original maximum number of permitted connections may be varied based on the relationship with the MMSC, based on pay rates, or based on any other criteria.

If the current client max is less than the real/original max, at block 930, the number of client connections available to the client is incremented. The process then continues to block 940. If the client max is not less than the client real/original max, the process continues directly to block 940.

At block 940, the process determines whether the number of client connections currently active is less than the client (max), the currently set maximum number of connections. If the number of connections is equal to the maximum number of allowable connections, i.e. there are no more available connections for the MMSC, the process continues to block 945, and the connection is refused. In one embodiment, the MMSC receives a "connection refused" notification. In another embodiment, the system queues the "refused" connection, but does not handle it. In that instance, the MMSC may receive a "delayed processing" notification, rather than a refusal notification.

If the number of client connections is less than the maximum, the process continues to block 950, and the connection is accepted. At block 960, the current number of client connections is incremented by one. The process then ends at block 970.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An exchange relay to enable communication between disparate multimedia message service centers (MMSCs), the exchange relay comprising:
   a receiving logic to receive a multimedia messaging service (MMS) message from an originating MMSC, the MMS message comprising at least one multimedia element;
   clearinghouse logic to store copies of each multimedia element sent through the exchange relay in a clearinghouse, to determine if the at least one multimedia element in the MMS message has a better quality copy in the clearinghouse and, if so, to substitute the better quality copy from the clearinghouse into the MMS message;
   a connection logic to attempt to establish a connection with a recipient MMSC to forward the MMS message to the recipient MMSC;
   a process queue to temporarily buffer the MMS message;
   a retry queue to store the MMS message received from the originating MMSC if the recipient MMSC is temporarily not available to receive the MMS message, wherein the MMS message stored in the retry queue is forwarded to the recipient MMSC once the recipient MMSC is available to receive the MMS message; and
   a message trace generator to track progress of the MMS message through the exchange relay.

2. The exchange relay of claim 1, further comprising:
   a throttling logic to control a rate of opening connections to the recipient MMSC.

3. The exchange relay of claim 2, wherein the throttling logic sends the MMS message from the process queue at a rate that is adjusted to an available bandwidth of the recipient MMSC.

4. The exchange relay of claim 2, wherein the throttling logic sends the MMS message from the process queue at a fixed rate determined by an agreement with the recipient MMSC.

5. The exchange relay of claim 2, wherein the throttling logic is further to control the number of incoming connections accepted from originating MMSCs.

6. The exchange relay of claim 1, further comprising an availability tester to determine whether the recipient MMSC is available, prior to or in conjunction with determining whether the recipient MMSC has the bandwidth to handle the MMS message.

7. The exchange relay of claim 1, further comprising:
   an MMSC access control to determine whether the originating MMSC has access to the recipient MMSC, and to send an error message if the originating MMSC does not have access.

8. The exchange relay of claim 1, further comprising:
   target capability lookup logic to determine a proper message format for the recipient MMSC, to ensure that messages sent to the recipient MMSC can be processed.

9. The exchange relay of claim 8, further comprising:
   message size reduction logic to reduce the size of the MMS message, if a maximum message size accepted by the recipient MMSC is smaller than the size of the MMS message.

10. The exchange relay of claim 8, further comprising:
    reformatting logic to reformat an element in the MMS message, if the recipient MMSC requires a different format for the element from an original format.

11. The exchange relay of claim 1, further comprising:
    audit/report generation logic to generate one or more reports for each contracting MMSC.

12. The exchange relay of claim 1, further comprising:
    DRM logic to verify forwarding rights for each multimedia element sent through the exchange relay, and to enable digital rights management of the multimedia elements.

13. The exchange relay of claim 1, further comprising:
    a retry logic to handle undelivered MMS messages in the retry queue that have been undeliverable for a period of time.

14. The exchange relay of claim 13, wherein handling comprises archiving or purging the undelivered MMS messages.

15. The exchange relay of claim 13, further comprising:
an audit/report generation logic to notify the originating MMSC of undelivered MMS messages intended but not delivered to the recipient MMSC.

16. The exchange relay of claim 1, further comprising:
a service provider identification (SPID) lookup and additional logic to look-up the SPID of the originating MMSC and the recipient MMSC if needed; and
a message rewrite logic to add the SPID data to the MMS message.

17. The exchange relay of claim 16, wherein the SPID lookup is further designed to determine whether the SPID is already part of a message ID, to avoid performing an SPID look-up.

18. The exchange relay of claim 16, wherein adding the SPID to the MMS message enables sharing of SPID information across relay servers, thereby reducing the number of SPID look-ups.

19. The exchange relay of claim 16, further comprising:
the message rewrite logic further designed to rewrite the MMS message to remove the SPID information, if the SPID was added by the exchange relay, prior to sending out the MMS message to an MMSC.

20. The exchange relay of claim 16, further comprising:
the message rewrite logic further designed to encode information in a message ID associated with a message to add additional data used by the exchange relay during processing.

21. The exchange relay of claim 20, wherein the information comprises one or more of the following: service provider identification (SPID) of the originating MMSC, SPID of the destination MMSC, and routing protocol to be used in communication with the originating MMSC.

22. The exchange relay of claim 20, wherein the message rewrite logic is further designed to rewrite the message ID to an original message ID, prior to returning data to the originating MMSC.

23. The exchange relay of claim 1, wherein
the message trace generator creates a message trace including the original message, an SPID of the originating MMSC, an SPID of the recipient MMSC, a message receipt time, and a message delivery time.

24. A method comprising:
receiving a multimedia messaging system (MMS) message from a first multimedia message service center (MMSC), the MMS message comprising at least one multi-media element;
storing copies of each multimedia element sent through the exchange relay in a clearinghouse;
determining if the clearinghouse has a better quality copy of the at least one multi-media element in the MMS message, and if so, substituting the better quality copy from the clearinghouse into the MMS message;
identifying a second MMSC to which the MMS message should be forwarded;
determining whether the second MMSC has bandwidth to handle the MMS message; and
if the second MMSC does not have bandwidth to handle the MMS message, storing the MMS message in a queue, wherein the MMS message is forwarded to the second MMSC once the second MMSC has bandwidth to handle the MMS message.

25. The method of claim 24, further comprising:
determining whether the recipient MMSC is available, prior to or in conjunction with determining whether the recipient MMSC has bandwidth to handle the MMS message.

26. The method of claim 25, further comprising:
using a pre-determined bandwidth value for the recipient MMSC to make the bandwidth determination.

27. The method of claim 24, further comprising:
determining when the recipient MMSC has bandwidth; and
sending accumulated MMS messages from the queue to the recipient MMSC at a throttled rate.

28. The method of claim 27, wherein the accumulated MMS messages from the queue are sent at a rate that is adjusted to the available bandwidth of the recipient MMSC.

29. The method of claim 24, further comprising:
archiving or purging undelivered MMS messages in the queue intended for the recipient MMSC that have been undeliverable for a period of time.

30. The method of claim 29, further comprising:
notifying the originating MMSC of the undelivered or archived MMS messages intended but not delivered to the recipient MMSC.

31. The method of claim 24, further comprising:
determining whether the originating MMSC has access to the recipient MMSC prior to sending the MMS message; and
sending an error message if the originating MMSC does not have access to the recipient MMSC.

32. The method of claim 24, further comprising:
determining a proper message format for the recipient MMSC, to ensure that messages sent to the recipient MMSC can be processed.

33. The method of claim 32, further comprising:
reducing the size of the MMS message, if a maximum message size accepted by the recipient MMSC is smaller than the size of the MMS message.

34. The method of claim 32, further comprising:
reformatting the MMS message, if the recipient MMSC requires a different format for the element from an original format.

35. The method of claim 24, further comprising:
generating a report for a contracting MMSC, in accordance with a form requested by the contracting MMSC.

36. The method of claim 24, further comprising:
verifying forwarding rights for each multimedia element sent through the exchange relay.

37. The method of claim 24, wherein a second MMSC that does not have the bandwidth to handle the MMS message includes a second MMSC that is not connected to a network.

* * * * *